US009058338B2

(12) United States Patent
Aslot et al.

(10) Patent No.: US 9,058,338 B2
(45) Date of Patent: Jun. 16, 2015

(54) STORING A SMALL FILE WITH A REDUCED STORAGE AND MEMORY FOOTPRINT (75) Inventors: Vishal Chittranjan Aslot, Austin, TX (US); Adekunle Bello, Austin, TX (US); Robert Wright Thompson, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 682 days.

(21) Appl. No.: 13/282,454

(22) Filed: Oct. 26, 2011

(65) Prior Publication Data

US 2013/0111182 A1    May 2, 2013

(51) Int. Cl.
  *G06F 12/10*  (2006.01)
  *G06F 17/30*  (2006.01)
  *G06F 3/06*  (2006.01)

(52) U.S. Cl.
  CPC .......... *G06F 17/30153* (2013.01); *G06F 12/10* (2013.01); *G06F 3/0608* (2013.01); *G06F 3/064* (2013.01); *G06F 3/0673* (2013.01)

(58) Field of Classification Search
  CPC .............................. G06F 12/0253; G06F 12/10
  See application file for complete search history.

(56) References Cited

U.S. PATENT DOCUMENTS

| 6,041,407 A | 3/2000 | Claar et al. |
| 6,571,261 B1 * | 5/2003 | Wang-Knop et al. ................. 1/1 |
| 7,599,972 B2 * | 10/2009 | Dodge et al. ........................ 1/1 |
| 7,681,010 B2 | 3/2010 | Hur |
| 7,804,718 B2 | 9/2010 | Kim |
| 7,830,753 B2 | 11/2010 | Nakata |
| 7,890,555 B2 | 2/2011 | Gunda et al. |
| 8,015,220 B1 | 9/2011 | Volkoff et al. |
| 8,015,387 B2 | 9/2011 | Kancherla |
| 2007/0143567 A1 * | 6/2007 | Gorobets ...................... 711/202 |
| 2011/0035557 A1 | 2/2011 | Luukkainen |
| 2011/0106806 A1 | 5/2011 | Tamas et al. |
| 2011/0113183 A1 | 5/2011 | Lee et al. |
| 2011/0167239 A1 | 7/2011 | Horn et al. |

OTHER PUBLICATIONS

Henson et al; Automatic Performance Tuning in the Zettabyte File System.

* cited by examiner

Primary Examiner — Christian P Chace
Assistant Examiner — Eric Loonan
(74) Attorney, Agent, or Firm — Garg Law Firm, PLLC; Rakesh Garg; Mark C. Vallone (57) ABSTRACT An I/O request to store a file in a file-system is received. A determination is made whether the size of the file does not exceed a threshold size. Exceeding the threshold results in storing at least a portion of the file in a block of the file-system devoid of sub-blocks. A determination is made whether the size of the file does not exceed a size of unallocated space within a single block in the file-system. The single block includes a set of sub-blocks. Responsive to the size of the file not exceeding the threshold size and the size of unallocated space within the single block, the file is stored, at an address, in a first subset of the set of the sub-blocks of the single block. The address identifies the single block and a position of a sub-block in the subset.

20 Claims, 5 Drawing Sheets

STORING A SMALL FILE WITH A REDUCED STORAGE AND MEMORY FOOTPRINT

TECHNICAL FIELD

The present invention relates generally to a method, system, and computer program product for an improved data storage. Particularly, the present invention relates to a method, system, and computer program product for storing a small file with a reduced storage and memory footprint.

BACKGROUND

A file is a data structure for storing data using a file-system on a data storage device. Some examples of the data storage devices (storage devices) on which file-systems are constructed include magnetic hard disk drives and tape drives, flash memory cards and other solid-state data storage devices, and optical data storage devices.

When an application requests a file, the file is loaded from the storage device into a working memory (memory). To enable this loading, reading, and writing of data to the storage device, the file data is stored on the storage device in blocks (pages) of a fixed size (page size). For example, data storage blocks in a particular configuration may be 64 Kilobytes (KB) in size, with a file's data being stored in one or more of such blocks.

A file-system being used, an operating system under which the file-system executes, a memory manager, or a combination thereof define the size of blocks used to store files in the file-system. The file-system keeps track of the blocks that comprise a file. As and when a file is requested, the blocks where the data of the requested file is stored are identified by the file-system, and some or all of the blocks storing the data of a file are loaded from, read from, or written to the storage device.

SUMMARY

The illustrative embodiments provide a method, system, and computer program product for storing a small file with a reduced storage and memory footprint.

In at least one embodiment, a method for storing files is provided. The method includes a processor receiving a first I/O request to store a first file in a file-system of a data storage device. The method further includes the processor determining whether the size of the first file does not exceed a threshold size, wherein exceeding the threshold results in storing at least a portion of the first file in a block of the file-system devoid of sub-blocks. The method further includes the processor determining whether the size of the first file does not exceed a size of unallocated space within a single block in the file system, the single block including a set of sub-blocks. The method further includes the processor, responsive to determining that the size of the first file does not exceed the threshold size, and responsive to determining that the size of the first file does not exceed the size of unallocated space within the single block in the file-system, storing, at a first address, the first file in a first subset of the set of the sub-blocks of the single block. The first address identifies the single block and a position of a sub-block in the subset.

In at least one embodiment, a computer program product for storing files is provided. The computer program product includes one or more computer-readable tangible storage devices. The computer program product further includes program instructions, stored on at least one of the one or more storage devices, to receive a first I/O request to store a first file in a file-system of a data storage device. The computer program product further includes program instructions, stored on at least one of the one or more storage devices, to determine whether the size of the first file does not exceed a threshold size, wherein exceeding the threshold results in storing at least a portion of the first file in a block of the file-system devoid of sub-blocks. The computer program product further includes program instructions, stored on at least one of the one or more storage devices, to determine whether the size of the first file does not exceed a size of unallocated space within a single block in the file system, the single block including a set of sub-blocks. The computer program product further includes program instructions, stored on at least one of the one or more storage devices, to, responsive to determining that the size of the first file does not exceed the threshold size, and responsive to determining that the size of the first file does not exceed the size of unallocated space within the single block in the file-system, store, at a first address, the first file in a first subset of the set of the sub-blocks of the single block. The first address identifies the single block and a position of a sub-block in the subset.

In at least one embodiment, a computer system for storing files is provided. The computer system includes one or more processors, one or more computer-readable memories and one or more computer-readable tangible storage devices. The computer system further includes program instructions, stored on at least one of the one or more storage devices for execution by at least one of the one or more processors via at least one of the one or more memories, to receive a first I/O request to store a first file in a file-system of a data storage device. The computer system further includes program instructions, stored on at least one of the one or more storage devices for execution by at least one of the one or more processors via at least one of the one or more memories, to determine whether the size of the first file does not exceed a threshold size, wherein exceeding the threshold results in storing at least a portion of the first file in a block of the file-system devoid of sub-blocks. The computer system further includes program instructions, stored on at least one of the one or more storage devices for execution by at least one of the one or more processors via at least one of the one or more memories, to determine whether the size of the first file does not exceed a size of unallocated space within a single block in the file system, the single block including a set of sub-blocks. The computer system further includes program instructions, stored on at least one of the one or more storage devices for execution by at least one of the one or more processors via at least one of the one or more memories, to, responsive to determining that the size of the first file does not exceed the threshold size, and responsive to determining that the size of the first file does not exceed the size of unallocated space within the single block in the file-system, store, at a first address, the first file in a first subset of the set of the sub-blocks of the single block. The first address identifies the single block and a position of a sub-block in the subset.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of illustrative embodiments when read in conjunction with the accompanying drawings, wherein:

DETAILED DESCRIPTION

The size of blocks used for storing file data on storage devices has increased with improvements in operating system and data storage technologies. Blocks having a 64 KB block size are commonly used in a variety of presently available file-systems and operating systems.

The illustrative embodiments recognize that while using large block sizes for file-systems may improve data read/write performance of a storage device, large block sizes waste data storage space on the storage device and memory under certain circumstances. For the purposes of this disclosure, a large block size (large page size) is a block size larger than a threshold size. A large block is a block having a large block size. Further for the purposes of this disclosure, a "block" means a "large block" unless qualified otherwise.

A file smaller than a fraction of the block size is called a small file within the scope of this disclosure. As an example of the wastage of storage and memory space, consider the common situation where a significant number of files are small files. In fact, some file-systems, such as email storage systems or text message storage systems in mobile communication devices, are specifically configured to support small files. When a large block is used to store a small file, a significant amount of space in that large block is unused on the storage device. When the large block is loaded in memory, the unused space of the large block translates into occupied but unused space in the corresponding memory page. Thus, storing a small file in a large block wastes data storage space on the storage device as well as in the memory.

A typical file-system is designed with the expectation that most small files will grow to occupy an entire block or more than one block. Therefore, as the illustrative embodiments recognize, where files are stored outside of a file's metadata or inode, presently available file-systems do not treat the storage mechanism of small files any differently than the storage mechanism of a file that occupies several blocks.

The illustrative embodiments further recognize that modern file-systems and operating systems are being improved to support increasingly larger block and page sizes, respectively, further exacerbating the data storage space wastage. Thus, in a typical implementation of a presently available file-system, the combination of small files and large blocks or pages results in wasted space on the storage devices and memory.

The illustrative embodiments used to describe the invention generally address and solve the above-described problems and other problems related to wasteful storage of small files. The illustrative embodiments provide a method, system, and computer program product for storing a small file with a reduced storage and memory footprint. A footprint of a file is an amount of space the file occupies on a given data storage device, and is typically larger than the amount of data present in the file due to the reasons explained above.

Generally, an embodiment provides a data storage and addressing scheme to achieve a reduction in the footprint of small files on both the data storage device as well as the working memory of a data processing system. Furthermore, an embodiment utilizes a common block size for storing large files and the small files, and improves the utilization of the block when used for storing a small file. A large file according to an embodiment is a file whose data size exceeds a certain fraction of the size of a block. A size corresponding to that fraction is called an upgrade size. A file is considered small if the file data is of a size up to the upgrade size, and large if the file data size exceeds the upgrade size.

Additionally, an embodiment provides a way to read, write, load, or otherwise manipulate an entire block. An embodiment maps different parts of a common block to different small files. The mapping according to an embodiment enables the reading, writing, and other operations on the small files without requiring read/write or load of partial blocks from the storage device. Thus, as improved by an embodiment, a presently available file-system continues to track the files and I/O operations at the block level without any complications of tracking partial blocks.

The illustrative embodiments are described with respect to certain data and data structures only as examples. Such descriptions are not intended to be limiting on the invention. For example, an illustrative embodiment described with respect to a particular block size, sub-block size, or address format can be implemented with additional or different sizes and formats within the scope of the illustrative embodiments.

Furthermore, the illustrative embodiments may be implemented with respect to any type of data, data source, or access to a data source over a data network. Any type of data application or storage device may provide the data, such as file data, to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle Corporation and/or its affiliates).

An illustrative embodiment may be implemented in hardware, software, or a combination thereof. An illustrative embodiment may further be implemented with respect to any type of data storage resource, such as a physical or a virtual data storage device that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, layouts, schematics, and tools only as examples and are not limiting on the illustrative embodiments. Furthermore, the illustrative embodiments are described in some instances using particular software and data processing environments only as an example for the clarity of the description. The illustrative embodiments may be used in conjunction with other comparable or similarly purposed structures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
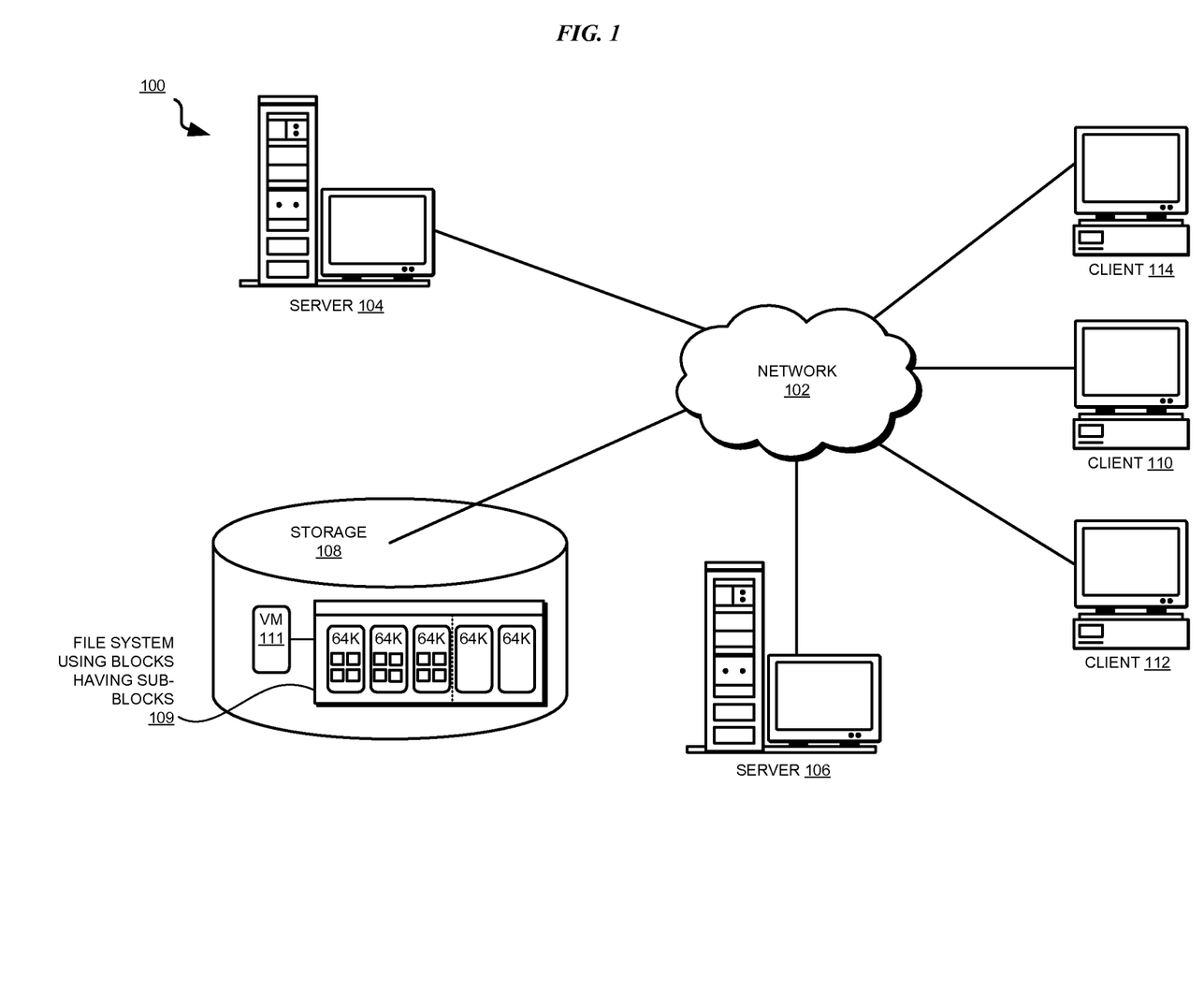
FIG. 1 depicts a pictorial representation of a network of data processing systems in which illustrative embodiments may be implemented.
Figure 2:
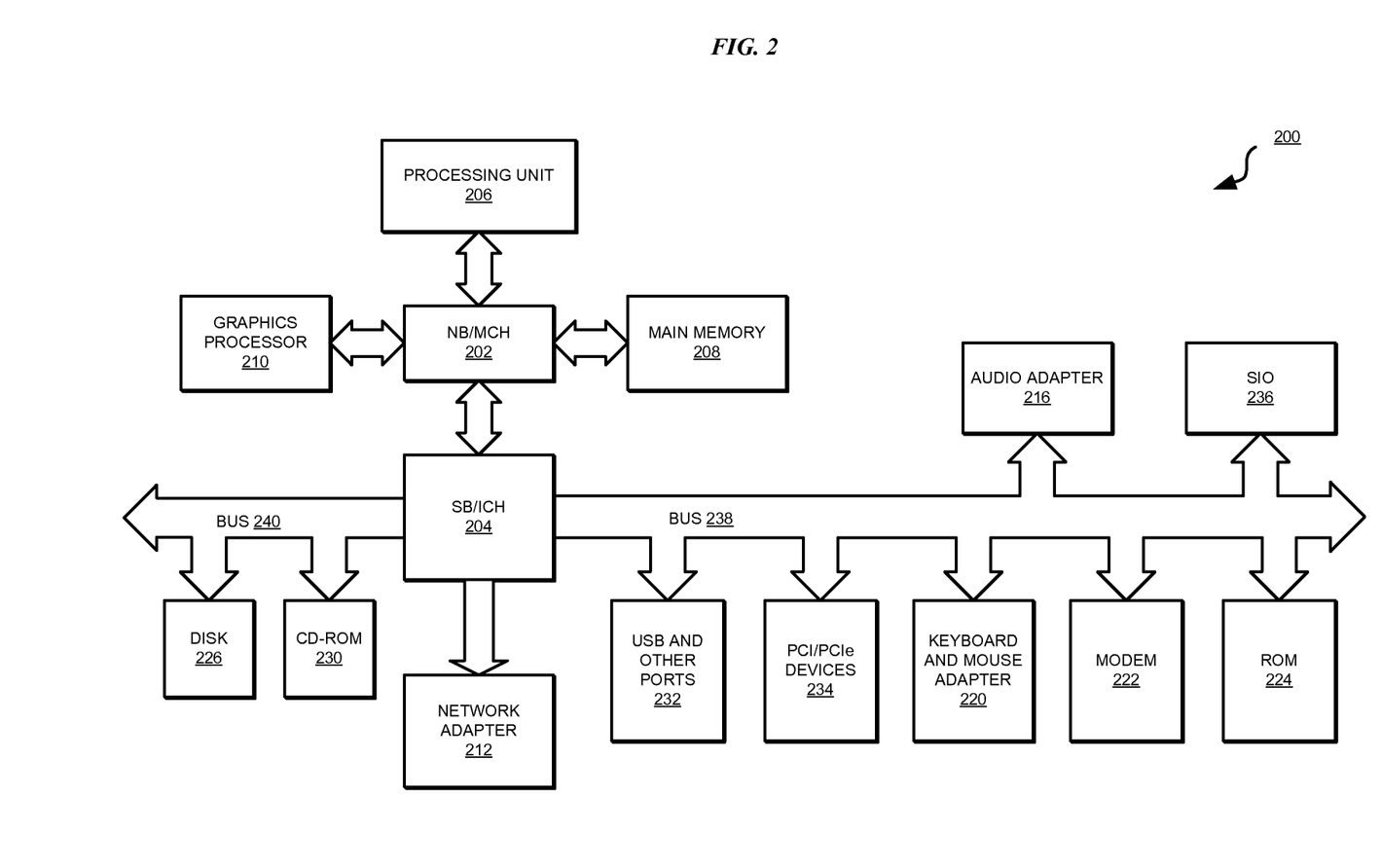
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114, may contain data and may have software applications or software tools executing thereon.

As an example, storage 108 includes file system 109 modified to use blocks that include sub-blocks in the manner of an embodiment. Volume manager 111 is an example application for managing file-system 109, such as for reading and writing data in blocks and sub-blocks of file-system 109. For example, file-system 109 is shown to use 64 KB blocks, some of which include sub-blocks according to an embodiment. In operation, an application executing in client 114 (not shown) may request to manipulate a file stored in file-system 109. Consequently, one or more blocks from file-system 109 are loaded into client 114's memory (not shown) so that the application executing in client 114 can manipulate the file data stored in those blocks. If the file being manipulated is a small file, the block storing the small file stores additional data according to an embodiment to reduce wasted data storage space on storage 108 and wasted page space in the memory of client 114.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 114 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may include one or more processors and may be implemented using one or more heterogeneous processor systems. Graphics processor 210 may be coupled to NB/MCH 202 through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD- ROM 230 may use, for example, an integrated drive electronics (IDE) or serial advanced technology attachment (SATA) interface. A super I/O (SIO) device 236 may be coupled to south bridge and I/O controller hub (SB/ICH) 204 through bus 238.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle and/or its affiliates).

Program instructions for the operating system, the file-system, the processes of the illustrative embodiments, and applications or programs, such as volume manager 111 of FIG. 1, are located on one or more storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
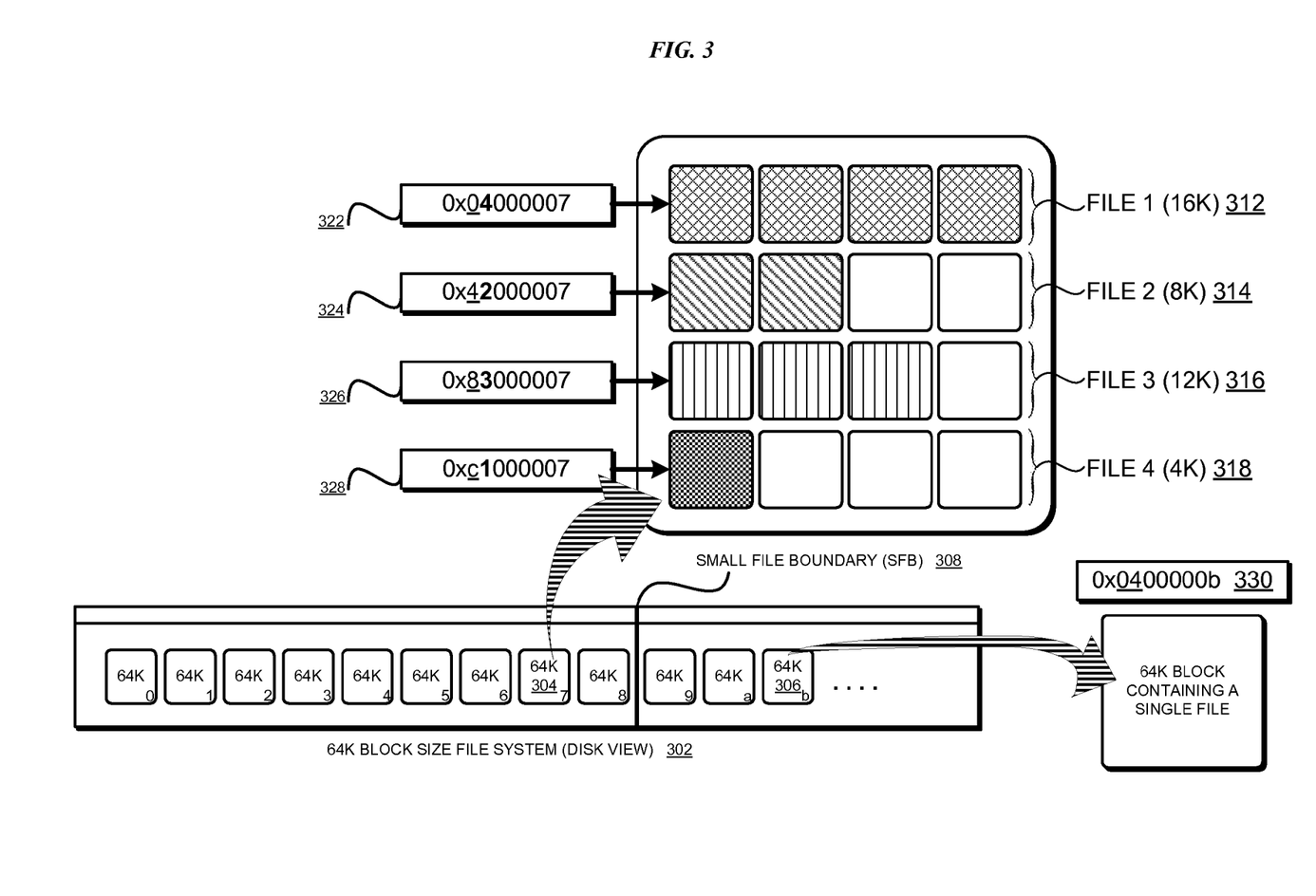
FIG. 3 depicts a block diagram of storing a small file with a reduced storage and memory footprint in accordance with an illustrative embodiment.

With reference to FIG. 3, this figure depicts a block diagram of storing a small file with a reduced storage and memory footprint in accordance with an illustrative embodiment. File-system 302 is usable as file-system 109 in FIG. 1.

Only as an example and without implying any limitation there from, file-system 302 is depicted to include blocks of 64 KB size. A block in file system 302, such as block 304, stores more than one small file for reducing the footprint of small files according to an embodiment. Another block of the same size, such as block 306, stores all or part of a large file, thus avoiding the need for blocks of different sizes. Small file boundary (SFB) 308 separates the blocks that store small files from the blocks that store large files.

In one embodiment, SFB 308 is dynamically adjusted as a function of the number of small files existing in file-system 302. For example, an application, such as volume manager 111 in FIG. 1, can utilize a rule or policy to trigger the dynamic adjustment of SFB 308.

In another embodiment, an application, such as volume manager 111 in FIG. 1, can set SFB 308 at the file-system creation time. Regardless of how determined, SFB 308 is adjustable. For example, as the number of small files increases in file-system 302, the application may move SFB 308 further to the right as depicted, to include more blocks similar to block 304 to accommodate more small files. Conversely, if the number of small files decreases in file-system 302, the application may move SFB 308 to the left as depicted, to allow more space for large files by increasing the number of blocks similar to block 306 and reducing the number of blocks similar to block 304.

A block that stores one or more small files, such as block 304, includes a set of sub-blocks of a sub-block size. A set of sub-blocks is one or more sub-blocks. The sub-block size is a size that can be determined according to a particular implementation.

As an example, in a given file-system, a significant number of small files may be of 4 KB size or less. Accordingly, in one embodiment, block 304 of size 64 KB includes sixteen sub-blocks of 4 KB size each.

A subset of the set of sub-blocks can be used for storing a small file. For example, a small file of size 4 KB occupies one sub-block of size 4 KB; another small file of size 8 KB occupies two sub-blocks of 4 KB each. Similarly, a small file of size 12 KB occupies three sub-blocks of 4 KB each.

The number of sub-blocks in the subset of sub-blocks that is used to store a small file depends on the upgrade size. The upgrade size is also determined based on the requirements of a particular implementation.

Continuing with the above example of 64 KB blocks with 4 KB sub-blocks, an administrator may select the upgrade size to be 16 KB. In other words, a small file can be stored using no more than four sub-blocks of 4 KB each.

A small file may increase in size, such as when data is written/added to the file. Once a small file exceeds the upgrade size, the small file becomes a large file. An application, such as volume manager 111 in FIG. 1, migrates the (formerly small) file (upgrade) from being stored using a subset of sub-blocks in a block, such as in block 304, to a block that is occupied by all or part of only one file, such as block 306. In one embodiment, the application copies the data of the formerly-small file from block 304 to block 306, and the application frees the sub-blocks previously occupied by the file in block 304.

Conversely, a large file may decrease in size, such as when data is deleted from the file. Once a large file shrinks at or below the upgrade size, the large file becomes a small file. Optionally, the (formerly large) file can be migrated (downgraded) by the application from being stored using a large block, such as block 306, to being stored using a subset of sub-blocks in a block, such as in block 304. In one embodiment, the application copies the data of the formerly-large file from block 306 to a subset of sub-blocks of block 304, and frees block 306 previously occupied by the file.

Continuing with the example using block size of 64 KB, sub-block size of 4 KB, and upgrade size of 16 KB, as an example, block 304 is depicted in an enlarged view in FIG. 3, showing the sub-blocks therein, the contents of the sub-blocks, and addressing of those contents according to an embodiment. In the depicted example, block 304 includes file 312 labeled "File 1" of size 16 KB and occupying four sub-blocks as depicted by shading. Block 304 further includes file 314 labeled "File 2" of size 8 KB and occupying two sub-blocks as depicted by shading. Block 304 further includes file 316 labeled "File 3" of size 12 KB and occupying three sub-blocks as depicted by shading. Block 304 further includes file 318 labeled "File 4" of size 4 KB and occupying one sub-block as depicted by shading.

Addresses 322, 324, 326, and 328 are constructed by an application managing file-system 302, such as volume manager 111 in FIG. 1, according to an embodiment such that applications requesting access to one of files 312-318, such as file 314, can access the sub-blocks holding file 314's data without reading or writing file 312 or file 316's sub-blocks.

The sub-blocks in block 304 are addressable using a two part addressing technique according to an embodiment. For example, address 322 allows an application to access file 312, address 324 allows an application to access file 314, address 326 allows an application to access file 316, and address 328 allows an application to access file 318. Each of addresses 322-328 are, as an example, 32-bit addresses. Further, only as an example and not as a limitation on an embodiment, each of addresses 322-328 comprises a lower part of the address and an upper part of the address.

For example, the lower order 24 bits, depicted as Hexadecimal "000007", form the lower part in each of addresses 322-328, and the higher order 8 bits depicted as Hexadecimal "04" in address 322, Hexadecimal "42" in address 324, Hexadecimal "83" in address 326, and Hexadecimal "c1" in address 328, form the upper part in those corresponding addresses. The lower order bits designate the starting block number (offset) for block 304 in file-system 302. As depicted, block 304 occupied the eighth position in file-system 302 (7, when blocks are numbered 0-n), hence, the value of "000007" in the lower order bits of addresses 322-328.

When a block includes sub-blocks, such as block 304, the high order bits represent information about the sub-blocks. When the block stores a large file without the sub-blocks, such as block 306, the higher order bits denote the number of large blocks used for storing the large file. In the case of blocks with sub-blocks, such as block 304, a first portion of the higher order bits denotes the starting sub-block number within a large block, and a second portion of the higher order bits denotes the number of sub-blocks used to store the small file.

As an example and not as a limitation, the highest four bits in address 322, having a value "0" (depicted as underlined) represents that small file 312 addressed by address 322 begins at sub-block 0 in block 304 at offset 7 in file-system 302. Similarly, the highest four bits in address 324, having a value "4" (depicted as underlined) represents that small file 314 addressed by address 324 begins at sub-block 4 in block 304 at offset 7 in file-system 302. Similarly, the highest four bits in address 326, having a value "8" (depicted as underlined) represents that small file 316 addressed by address 326 begins at sub-block 8 in block 304 at offset 7 in file-system 302. Similarly, the highest four bits in address 328, having a value "c" (depicted as underlined) represents that small file 318 addressed by address 328 begins at sub-block 12 in block 304 at offset 7 in file-system 302.

Also as an example and not as a limitation, the next highest four bits in address 322, having a value "4" (depicted as boldfaced) represents that small file 312 addressed by address 322 occupies 4 sub-blocks starting at sub-block 0 in block 304 at offset 7 in file-system 302. Similarly, the next highest four bits in address 324, having a value "2" (depicted as boldfaced) represents that small file 314 addressed by address 324 occupies 2 sub-blocks starting at sub-block 4 in block 304 at offset 7 in file-system 302. Similarly, the next highest four bits in address 326, having a value "3" (depicted as boldfaced) represents that small file 316 addressed by address 326 occupies 3 sub-blocks starting at sub-block 8 in block 304 at offset 7 in file-system 302. Similarly, the next highest four bits in address 328, having a value "1" (depicted as boldfaced) represents that small file 318 addressed by address 328 occupies 1 sub-block starting at sub-block 12 in block 304 at offset 7 in file-system 302.

In one embodiment, upon first storage into a block with sub-blocks, an application managing file system 302, such as volume manager 111 in FIG. 1, allocates a subset of sub-blocks to a small file, the size of the subset being the upgrade size divided by the sub-block size. For example, the application allocates to file 312 four sub-blocks (16 KB upgrade size, divided by 4 KB sub-block size) and file 312 occupies all four sub-blocks. Similarly, the application allocates to file 314 four sub-blocks but file 314 occupies only two of the four sub-blocks. Similarly, the application allocates to file 316 four sub-blocks but file 316 occupies only three of the four sub-blocks. Similarly, the application allocates to file 318 four sub-blocks but file 318 occupies only one of the four sub-blocks.

As an example and not as a limitation, for a large file stored using a block to the right of SFB 308, the full 32-bit address represents the 64 KB blocks. The highest 8 bits may be used to count up to 256 contiguous 64 KB blocks forming a large file, and the lower order 24 bits designate the 64 KB block number, or offset, in a manner similar to the lower order bits of addresses of blocks to the left of SFB 308. For example, address 330 indicates that block 306 is the eleventh block (Hexadecimal "00000b") in file-system 302 and the starting block of a large file that consumes four ("Hexadecimal "04", depicted as underlined) 64 KB blocks.

In other words, the lower part of the address operates as an offset into the blocks array in the file-system, and the upper part of the address operates as a vector into the block for locating a small file therein or indicates a size of a large block array used to store a large file. Thus, the addressing scheme allows storing multiple small files using sub-blocks in a block, yet maintains addressability of each individual small file within the block.

The addressing scheme further allows storing large files and small files using the same block sizes in a manner that is transparent to the file-system, yet reducing the footprint of small files in the file-system. When a small file block is loaded into memory as a page, the addressing scheme allows applications to transparently access the small files in the page without corrupting adjacent small files in the same page, yet reduces the footprint of small files in the memory. Addressing of small files in memory is described in further detail with respect to FIG. 4.

While an addressing scheme is described using 32 bit addresses split into 24 bits and 8 bits, an embodiment can be implemented with an address of any size, partitioned into two parts of any size as needed in a particular implementation within the scope of the illustrative embodiments. Furthermore, while a small file is allocated a number of sub-blocks based on an example calculation using the upgrade size and the sub-block size, an implementation can chose to allocate a different number of sub-blocks, computed using a different algorithm, within the scope of the illustrative embodiments. Allocating different numbers of sub-blocks to different small files within a block is not precluded by any description of any illustrative embodiment.

Figure 4:
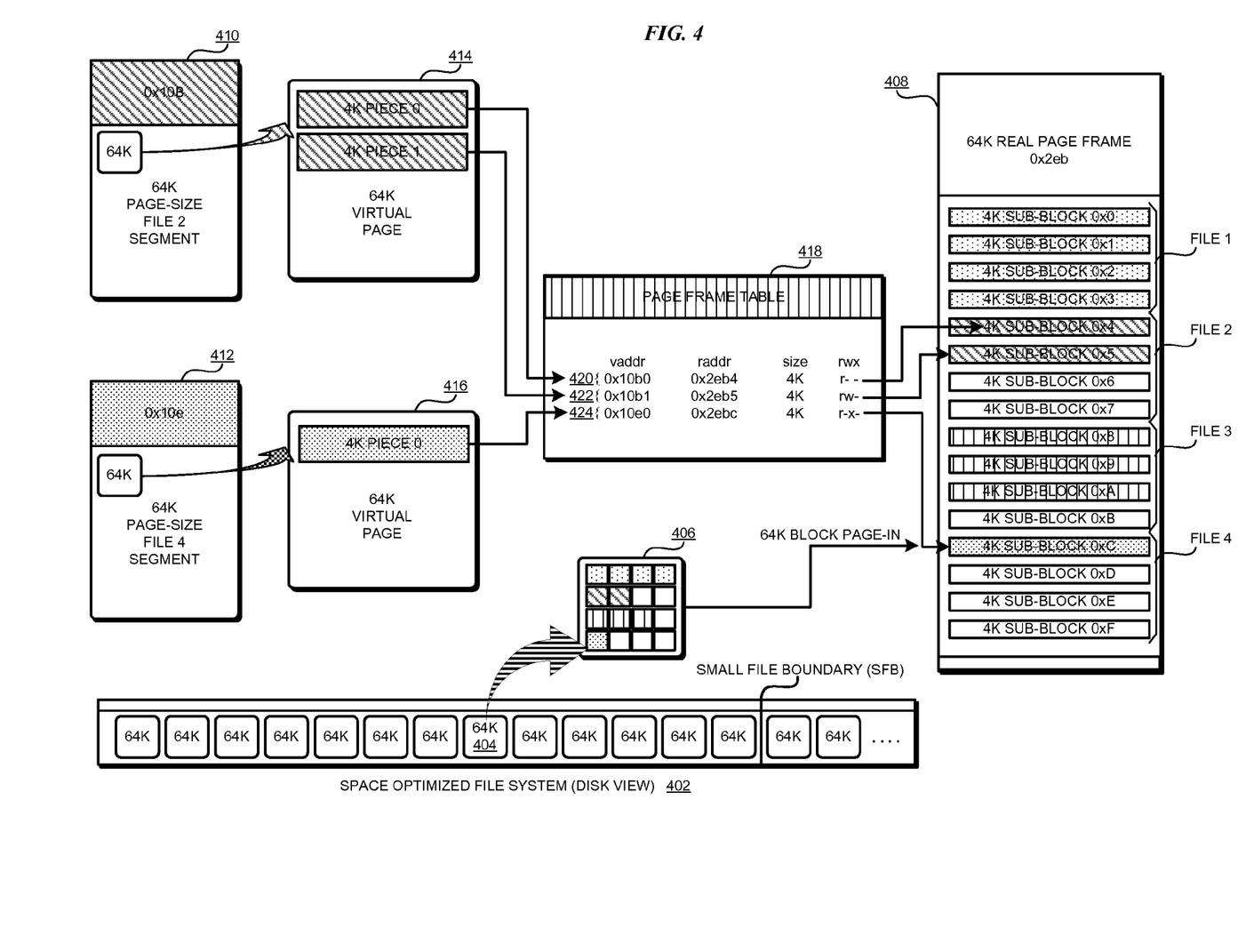
FIG. 4 depicts an address mapping technique for addressing separate small files within a common memory page in accordance with an illustrative embodiment.

With reference to FIG. 4, this figure depicts an address mapping technique for addressing separate small files within a common memory page in accordance with an illustrative embodiment. File-system 402 corresponds to file-system 302 in FIG. 3. Block 404 corresponds to block 304 in FIG. 3 and includes a set of sub-blocks are depicted in the enlarged view 406 of block 404. As an example, block 404 is of 64 KB size and includes four files occupying four, two, three, and one sub-blocks respectively, as an example configuration described with respect to block 304 in FIG. 3 and as depicted in enlarged view 406 in FIG. 4. File-system 402 knows at page-in time, if file-system 402 is paging in a small file block or a large file block. If the block number is smaller than SFB, such as depicted for example block 404, the block being paged-in is a known to be small file block; otherwise the block is considered a large file block.

Block 406 is paged into real memory, such as main memory 208 of FIG. 2, as page 408. Page 408 is a 64 KB real page frame located at an example real memory address 0x2eb. "File 1" is located at sub-blocks 0x0-0x3, occupying four 4 KB sub-blocks in page 408 as shown. "File 2" is located at sub-blocks 0x4-0x7, occupying two 4 KB sub-blocks in page 408 as shown. "File 3" is located at sub-blocks 0x8-0xb, occupying three 4 KB sub-blocks in page 408 as shown. "File 4" is located at sub-blocks 0xc-0xf, occupying one 4 KB sub-block in page 408 as shown.

As an example, assume that File 2 and File 4 are in use by applications and are therefore in memory and have their own virtual memory segments—virtual memory segment 410 for File 2 at virtual address 0x10b and virtual memory segment 412 for File 4 at virtual address 0x10e. Assuming a 64 KB page size to correspond with the 64 KB block size in this example, File 2 and File 4 can each have at most one 64 KB virtual page as they are small files (smaller than 16 KB in this example). File 2 has virtual page 414, and File 4 has virtual page 416 as shown.

On a data storage device, File 2 has two 4K sub-blocks and File 4 has one 4K sub-block as described earlier, and therefore, File 2 has two 4K sub-blocks and File 4 one 4K sub-block in the real page frame of 64 KB (real memory page 408) when loaded. In virtual memory, as referenced by the applications accessing File 2 and File 4, the two blocks of File 2 have virtual addresses 0x10b0 and 0x10b1, and the one block of File 4 has the virtual address 0x10e0. These virtual addresses are used by the applications for manipulating the contents of Files 2 and 4.

An application that manages memory access in a data processing system maintains the information included in page frame table 418. Page frame table 418 includes a mapping of virtual addresses of small file sub-blocks to real addresses of the corresponding sub-blocks in page 408. For example, as depicted in row 420, virtual address 0x10b0 maps to real address 0x2eb4, for a (sub) block size of 4 KB. As depicted in row 422, virtual address 0x10b1 maps to real address 0x2eb5, for a (sub) block size of 4 KB. Similarly, as depicted in row 424, virtual address 0x10e0 maps to real address 0x2ebc, for a (sub) block size of 4 KB. Note that the virtual addresses 0x10b0, 0x10b1, and 0x10e0 are virtual page numbers and not full byte offsets. Similarly, 0x2eb is a real page frame number and not a full byte offset. In other words, the full byte addresses corresponding to the depicted virtual addresses (page numbers) would be 0x10b0000, 0x10b1000, and 0x10e0000, respectively, and an implementation can use page numbers or full byte offsets within the scope of the illustrative embodiments.

Page frame table 418 also includes permissions for each sub-block, such as access permission per thread accessing a particular sub-block. For example, as depicted in row 420, a thread accessing virtual address 0x10b0, which maps to real address 0x2eb4, has only Read permission for that (sub) block size of 4 KB. As depicted in row 422, another thread accessing virtual address 0x10b1, which maps to real address 0x2eb5, has Read and write permissions for that (sub) block size of 4 KB. Similarly, as depicted in row 424, a thread accessing virtual address 0x10e0, which maps to real address 0x2ebc, has Read and Execute permissions for that (sub) block size of 4 KB.

As this example illustrates, the sub-blocks based storage of a small file according to an embodiment is transparent to an application accessing the small file. The address mapping directs the file operation for a small file from the virtual address to a real address where the required sub-block of the small file is located. Furthermore, the mapping maintains the isolation between small files sharing a common block. The mapping prevents accidental read or write of sub-blocks that do not belong to a target small file by specifying the size of the (sub) block to which a row in page frame table 418 pertains.

Figure 5:
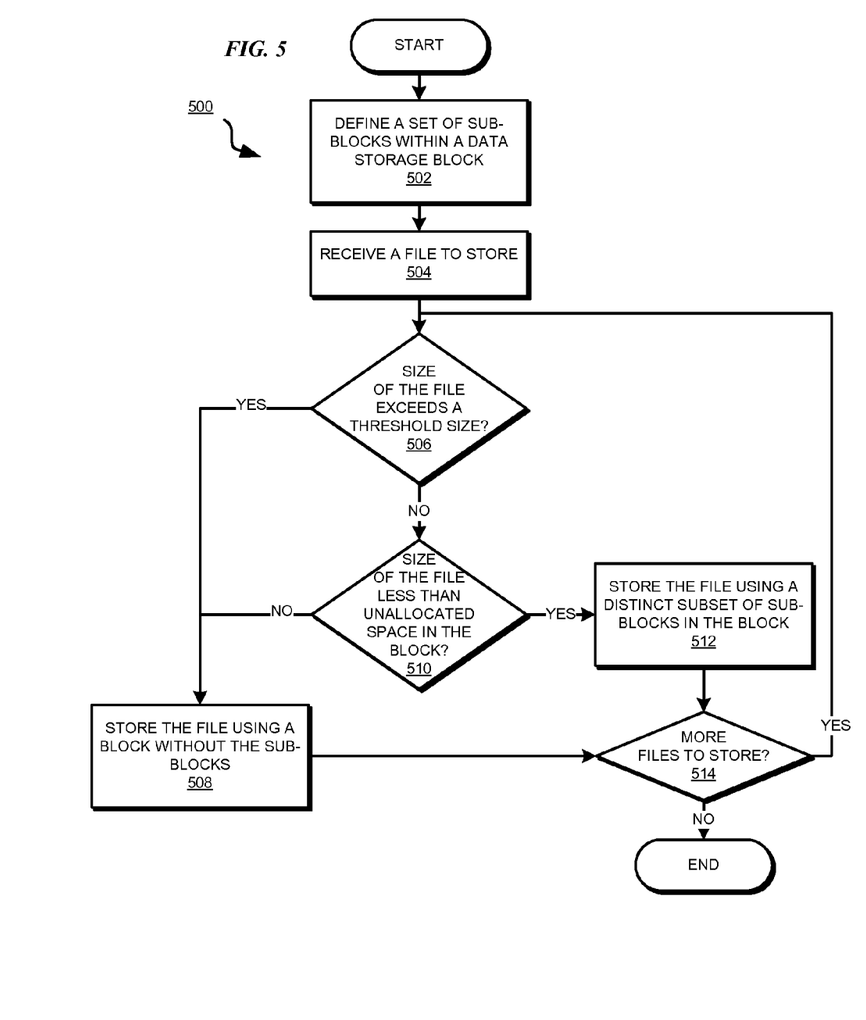
FIG. 5 depicts a flowchart of an example process of storing a small file with a reduced storage and memory footprint in accordance with an illustrative embodiment.

With reference to FIG. 5, this figure depicts a flowchart of an example process of storing a small file with a reduced storage and memory footprint in accordance with an illustrative embodiment. Process 500 can be implemented in an application to manage a file-system, such as volume manager 111 in FIG. 1. The application including process 500 can take the form of program instructions of an application storable on at least one of one or more computer readable mediums and executed by at least one of one or more processors via at least one of one or more memories for managing a file-system, such as file-system 402 in FIG. 4. Volume manager 111 in FIG. 1 is only one example of such an application, without implying a limitation on the illustrative embodiments to only a volume manager form of such an application.

The application defines a set of sub-blocks within a data storage block for a given file-system (block 502). For example, in block 502 of process 500, the application defines a sub-block size, a number of sub-blocks in a block of a given size in the file-system, a location of a SFB (e.g., after a defined number of blocks on a disk), or a combination thereof.

The application receives a file to store using the blocks of the file-system (block 504). The application determines whether the size of the file exceeds a threshold size (block 506). In other words, at block 506, the application determines whether the file will fit within a number of sub-blocks allocable to a single small file (such as a number computed using the upgrade size and the sub-block size).

If the application determines that the size of the file exceeds the threshold ("Yes" path of block 506), the application stores at least a portion of the file using a large block without using the sub-blocks (block 508). If the application determines that the size of the file does not exceed the threshold ("No" path of block 506), the application determines whether the size of the file is less than the unallocated space in a given block with sub-blocks (block 510).

For example, a 64 KB block may be defined to have sixteen sub-blocks of 4 KB each as in previous examples. Of the sixteen sub-blocks, four sub-blocks may have been occupied by another small file, leaving twelve sub-blocks available for other small files. The application may determine at block 510 of process 500 that the file received in block 504 of process 500 is 8 KB in size that could fit in two of the remaining twelve unallocated sub-blocks. The application may further determine that the two sub-blocks is less than four sub-blocks that are allocable to a single small file.

If the application determines that the size of the file is less than (or equal to) the unallocated space in the block with sub-blocks, and that the file is a small file that would fit in less than or equal to defined number of sub-blocks ("Yes" path of block 510), the application stores the file using a distinct subset of sub-blocks in the block (block 512). If the size of the file is greater than the unallocated space in the block with sub-blocks, or that the file would not fit in less than or equal to defined number of sub-blocks ("No" path of block 510), the application stores at least a portion of the file using a large block without using the sub-blocks at block 508.

The application determines whether more files remain to be stored (block 514). If another file remains to be stored ("Yes" path of block 514), the application returns to block 506. If no more files are to be stored ("No" path of block 514), the application ends process 500.

If the other file to be stored is also a small file, in one execution of process 500, the application stores the second small file in the same block as the first small file at block 512, but using a subset of sub-blocks that is distinct from the subset of sub-blocks storing the first small file. If the other file is a large file, the application stores at least a portion of the large file using another large block at block 508.

Figure 6:
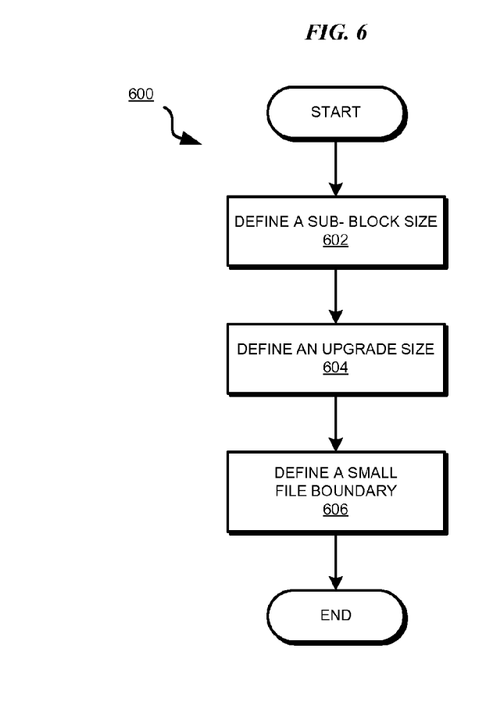
FIG. 6 depicts a flowchart of an example process of configuring a file-system for storing a small file with a reduced storage and memory footprint in accordance with an illustrative embodiment.

With reference to FIG. 6, this process depicts a flowchart of an example process of configuring a file-system for storing a small file with a reduced storage and memory footprint in accordance with an illustrative embodiment. Process 600 can be implemented in an application to manage a file-system, such as volume manager 111 in FIG. 1, which can take the form of program instructions storable on at least one of one or more computer readable mediums and executed by at least one of one or more processors via at least one of one or more memories for managing a file-system, such as file-system 402 in FIG. 4.

The application defines a sub-block size to be used within a block for a given file-system (block 602). The application further defines an upgrade size to be used as described earlier with respect to an embodiment (block 604). The application also defines a small file boundary that can be used as described earlier with respect to an embodiment (block 606). The application terminates process 600 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a method, system, and computer program product are provided in the illustrative embodiments for storing a small file with a reduced storage and memory footprint. Although some embodiments are described with respect to a particular type of storage device, file-system, block size, or a combination thereof, an embodiment can be practiced with other types of storage devices, file-systems, and block sizes without limitation. An embodiment can be used to reduce the wasted space in storing a small file on a storage device, and in loading a small file into memory.

An embodiment can conserve storage space and memory by suitably adjusting the upgrade size and SFB. Furthermore, an embodiment can conserve the storage space and memory in a manner that allows continued exploitation of the advantages from large block sizes, and in a manner that avoids having to change the architectures of applications that manipulate small files.

A large block of an embodiment can be of the largest size of blocks handled by a given file-system. A sub-block of an embodiment can be of the smallest page size for which a page table entry can be made. While certain embodiments are described using blocks and pages of equal sizes, such equality is not intended to be limiting on the illustrative embodiments. An embodiment can be implemented in an environment where the block size supported by a file-system is smaller than a page size supported by the operating system, or vice versa, within the scope of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires,—a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for storing files, the method comprising:
a processor receiving a first I/O request to store a first file in a file-system of a data storage device;
the processor determining whether the size of the first file does not exceed a threshold size, wherein the size of the first file exceeding the threshold size results in storing at least a portion of the first file in a block of the file-system, wherein the block does not have any addressable sub-blocks configured in the block and wherein the block is only addressable as a whole;
the processor determining whether the size of the first file does not exceed a size of unallocated space within a single block in the file system, the single block comprising a set of at least two addressable sub-blocks, each sub-block in the set of sub-blocks being of equal size; and
the processor, responsive to determining that the size of the first file does not exceed the threshold size, and responsive to determining that the size of the first file does not exceed the size of unallocated space within the single block in the file-system, storing, at a first address, the first file in a first subset of the set of the sub-blocks of the single block,
wherein the first address identifies the single block and a position of a sub-block in the subset.

2. The method of claim 1, further comprising:
the processor receiving a second I/O request to store a second file in the file-system;
the processor determining whether the size of the second file does not exceed the threshold size, wherein the size of the second file exceeding the threshold size results in storing at least a portion of the second file in a second block of the file-system devoid of sub-blocks;
the processor determining whether the size of the second file does not exceed a size of remaining unallocated space within the single block in the file system; and
the processor, responsive to determining that the size of the second file does not exceed the threshold size, and responsive to determining that the size of the second file does not exceed the size of remaining unallocated space within the single block in the file-system, storing, at a second address, the second file in a second subset of the set of the sub-blocks of the single block,
wherein the second address identifies the single block and a position of a sub-block in the second subset.

3. The method of claim 1, further comprising:
the processor using a first part of the first address as an offset to locate the single block; and
the processor using a second part of the first address to locate the position of the sub-block, wherein sub-blocks in the first subset of sub-blocks storing the first file are contiguous within the single block, and the position of the sub-block includes (i) an ordinal position of a first sub-block in the contiguous sub-blocks storing the first file, and (ii) a number of sub-blocks in the first subset.

4. The method of claim 1, further comprising:
the processor loading the single block as a real page frame into a working memory of a data processing system; and
the processor mapping a virtual address used by an application thread to access a part of the first file, to a first address of a sub-block in the real page frame, contents of the sub-block in the real page frame being loaded from a corresponding sub-block in the first subset.

5. The method of claim 1, wherein a size of the single block is a largest block size in use in the file-system.

6. The method of claim 1, wherein the size of a sub-block in the set of sub-blocks is equal to a smallest page size for which an operating system can make a page table entry.

7. The method of claim 1, further comprising:
the processor receiving a second I/O request to store a second file in the file-system;
the processor determining whether the size of the second file does not exceed the threshold size, wherein the size of the second file exceeding the threshold size results in storing at least a portion of the second file in a second block of the file-system devoid of sub-blocks;
the processor, responsive to determining that the size of the second file exceeds the threshold size, storing at least a first portion of the second file in the second block that does not have any addressable sub-blocks, the second block being located on one side of a boundary in the data storage device, and storing the at least a second portion of the second file located on a different side of the boundary, the boundary delineating storage on the one side of the boundary of only a first set of blocks that do not have any addressable sub-blocks from storage on the different side of the boundary of only a second set of blocks that include sub-blocks, wherein the single block belongs to the first set of blocks, and wherein the second block of the file-system belongs to the second set of blocks.

8. The method of claim 1, further comprising:
the processor receiving a second I/O request to store a second file in the file-system;
the processor determining whether the size of the second file does not exceed a size of remaining unallocated space within the single block in the file system; and
the processor, responsive to determining that the size of the second file exceeds the size of remaining unallocated space within the single block in the file-system, storing at least a first portion of the second file in a second block that does not have any addressable sub-blocks, the second block being located on one side of a boundary in the data storage device, and storing the at least a second portion of the second file located on a different side of the boundary, the boundary delineating storage on the one side of the boundary of only a first set of blocks that do not have any addressable sub-blocks from storage on the different side of the boundary of only a second set of blocks that include sub-blocks, wherein the single block belongs to the first set of blocks, and wherein the second block of the file-system belongs to the second set of blocks.

9. A computer program product comprising one or more non-transitory computer-readable storage devices and computer-readable program instructions which are stored on the one or more storage devices and when executed by one or more processors, perform the method of claim 1.

10. A computer system comprising one or more processors, one or more computer-readable memories, one or more non-transitory computer-readable storage devices and program instructions which are stored on the one or more storage devices for execution by the one or more processors via the one or more memories and when executed by the one or more processors perform the method of claim 1.

11. A computer program product for storing files, the computer program product comprising:
one or more non-transitory computer-readable storage devices;
program instructions, stored on at least one of the one or more storage devices, to receive a first I/O request to store a first file in a file-system of a data storage device;
program instructions, stored on at least one of the one or more storage devices, to determine whether the size of the first file does not exceed a threshold size, wherein the size of the first file exceeding the threshold size results in storing at least a portion of the first file in a block of the file-system, wherein the block does not have any addressable sub-blocks configured in the block and wherein the block is only addressable as a whole;
program instructions, stored on at least one of the one or more storage devices, to determine whether the size of the first file does not exceed a size of unallocated space within a single block in the file system, the single block comprising a set of at least two addressable sub-blocks, each sub-block in the set of sub-blocks being of equal size; and
program instructions, stored on at least one of the one or more storage devices, to, responsive to determining that the size of the first file does not exceed the threshold size, and responsive to determining that the size of the first file does not exceed the size of unallocated space within the single block in the file-system, store, at a first address, the first file in a first subset of the set of the sub-blocks of the single block,
wherein the first address identifies the single block and a position of a sub-block in the subset.

12. The computer program product of claim 11, further comprising:
program instructions, stored on at least one of the one or more storage devices, to receive a second I/O request to store a second file in the file-system;
program instructions, stored on at least one of the one or more storage devices, to determine whether the size of the second file does not exceed the threshold size, wherein the size of the second file exceeding the threshold size results in storing at least a portion of the second file in a second block of the file-system devoid of sub-blocks;
program instructions, stored on at least one of the one or more storage devices, to determine whether the size of the second file does not exceed a size of remaining unallocated space within the single block in the file system; and
program instructions, stored on at least one of the one or more storage devices, to, responsive to determining that the size of the second file does not exceed the threshold size, and responsive to determining that the size of the second file does not exceed the size of remaining unallocated space within the single block in the file-system, store, at a second address, the second file in a second subset of the set of the sub-blocks of the single block,
wherein the second address identifies the single block and a position of a sub-block in the second subset.

13. The computer program product of claim 11, further comprising:
program instructions, stored on at least one of the one or more storage devices, to use a first part of the first address as an offset to locate the single block; and program instructions, stored on at least one of the one or more storage devices, to use a second part of the first address to locate the position of the sub-block, wherein sub-blocks in the first subset of sub-blocks storing the first file are contiguous within the single block, and the position of the sub-block includes (i) an ordinal position of a first sub-block in the contiguous sub-blocks storing the first file, and (ii) a number of sub-blocks in the first subset.

14. The computer program product of claim 11, further comprising:
program instructions, stored on at least one of the one or more storage devices, to load the single block as a real page frame into a working memory of a data processing system; and
program instructions, stored on at least one of the one or more storage devices, to map a virtual address used by an application thread to access a part of the first file, to a first address of a sub-block in the real page frame, contents of the sub-block in the real page frame being loaded from a corresponding sub-block in the first subset.

15. The computer program product of claim 11, wherein a size of the single block is a largest block size in use in the file-system.

16. The computer program product of claim 11, wherein the size of a sub-block in the set of sub-blocks is equal to a smallest page size for which an operating system can make a page table entry.

17. The computer program product of claim 11, further comprising:
program instructions, stored on at least one of the one or more storage devices, to receive a second I/O request to store a second file in the file-system;
program instructions, stored on at least one of the one or more storage devices, to determine whether the size of the second file does not exceed the threshold size, wherein the size of the second file exceeding the threshold size results in storing at least a portion of the second file in a second block of the file-system devoid of sub-blocks;
program instructions, stored on at least one of the one or more storage devices, to, responsive to determining that the size of the second file exceeds the threshold size, store at least a first portion of the second file in the second block that does not have any addressable sub-blocks, the second block being located on one side of a boundary in the data storage device, and storing the at least a second portion of the second file located on a different side of the boundary, the boundary delineating storage on the one side of the boundary of only a first set of blocks that do not have any addressable sub-blocks from storage on the different side of the boundary of only a second set of blocks that include sub-blocks, wherein the single block belongs to the first set of blocks, and wherein the second block of the file-system belongs to the second set of blocks.

18. The computer program product of claim 11, wherein the program instructions are stored in the one or more non-transitory computer-readable storage devices in a data processing system, and wherein the program instructions are transferred over a network from a remote data processing system.

19. The computer program product of claim 11, wherein the program instructions are stored in the one or more non-transitory computer-readable storage devices in a server data processing system, and wherein the program instructions are downloaded over a network to a remote data processing system for use in a non-transitory computer-readable storage device associated with the remote data processing system.

20. A computer system for storing files, the computer system comprising:
one or more processors, one or more computer-readable memories and one or more non-transitory computer-readable storage devices;
program instructions, stored on at least one of the one or more storage devices for execution by at least one of the one or more processors via at least one of the one or more memories, to receive a first I/O request to store a first file in a file-system of a data storage device;
program instructions, stored on at least one of the one or more storage devices for execution by at least one of the one or more processors via at least one of the one or more memories, to determine whether the size of the first file does not exceed a threshold size, wherein the size of the first file exceeding the threshold size results in storing at least a portion of the first file in a block of the file-system, wherein the block does not have any addressable sub-blocks configured in the block and wherein the block is only addressable as a whole;
program instructions, stored on at least one of the one or more storage devices for execution by at least one of the one or more processors via at least one of the one or more memories, to determine whether the size of the first file does not exceed a size of unallocated space within a single block in the file system, the single block comprising a set of sub-blocks, each sub-block in the set of sub-blocks being of equal size; and
program instructions, stored on at least one of the one or more storage devices for execution by at least one of the one or more processors via at least one of the one or more memories, to, responsive to determining that the size of the first file does not exceed the threshold size, and responsive to determining that the size of the first file does not exceed the size of unallocated space within the single block in the file-system, store, at a first address, the first file in a first subset of the set of the sub-blocks of the single block,
wherein the first address identifies the single block and a position of a sub-block in the subset.

* * * * *